United States Patent
Orosz et al.

(10) Patent No.: US 7,455,732 B2
(45) Date of Patent: Nov. 25, 2008

(54) APPARATUS AND SYSTEMS FOR COATING OBJECTS

(75) Inventors: Gary R. Orosz, Valencia, PA (US); James M. Gleason, Newburgh, IN (US)

(73) Assignees: PPG Industries Ohio, Inc., Cleveland, OH (US); George Koch Sons, L.L.C., Evansville, IN (US)

( * ) Notice: Subject to any disclaimer, the term of this patent is extended or adjusted under 35 U.S.C. 154(b) by 222 days.

(21) Appl. No.: 11/201,527

(22) Filed: Aug. 11, 2005

(65) Prior Publication Data
US 2006/0051512 A1 Mar. 9, 2006

Related U.S. Application Data

(60) Provisional application No. 60/601,729, filed on Aug. 13, 2004.

(51) Int. Cl.
B05C 3/02 (2006.01)
B05C 3/10 (2006.01)

(52) U.S. Cl. .............. 118/423; 118/428; 118/500; 118/621; 118/623; 204/202

(58) Field of Classification Search .......... 118/426, 118/428, 500, 423, 50.1, 620, 621, 623; 204/202, 198, 224 R, 206; 427/435, 443.1; 198/848, 849
See application file for complete search history.

(56) References Cited

U.S. PATENT DOCUMENTS

| | | |
|---|---|---|
| 1,168,281 A | 1/1916 | Buch |
| 1,908,830 A | 5/1933 | Edison |
| 2,011,328 A | 8/1935 | Tuttle |
| 2,215,144 A | 9/1940 | Clayton |
| 2,215,166 A | 9/1940 | Sumner et al. |
| 2,638,423 A * | 5/1953 | Davis et al. ................ 427/251 |
| 2,909,271 A | 10/1959 | Taylor |
| 2,925,165 A | 2/1960 | Rake |
| 3,049,482 A | 8/1962 | Dolan |
| 3,193,085 A * | 7/1965 | Whipple ................... 198/456 |
| 3,228,357 A | 1/1966 | Bruschke et al. |
| 3,496,082 A * | 2/1970 | Orem et al. ................ 204/482 |
| 3,539,489 A | 11/1970 | Ness |
| 3,557,938 A | 1/1971 | Egon |
| 3,565,782 A | 2/1971 | Wehrmann |
| 3,575,832 A | 4/1971 | Johnson |
| 3,607,711 A | 9/1971 | Koch II et al. |
| 3,616,392 A | 10/1971 | Haney |

(Continued)

FOREIGN PATENT DOCUMENTS

BE 834038 A7 1/1976

(Continued)

Primary Examiner—Laura Edwards
(74) Attorney, Agent, or Firm—Donald R. Palladino

(57) ABSTRACT

Apparatus and systems for the application of a coating to an object. The systems comprise a continuous belt comprising at least one supporting member positioned to retain the object thereon, a drive member in operative engagement with the continuous belt, a coating unit in communication with the continuous belt, and a drying unit in communication with the continuous belt and the coating unit and arranged such that the object is coated and dried on the continuous belt. The supporting member of the belt may include at least one blade member comprising a plurality of projections, at least one of which is positioned to contact the object.

21 Claims, 7 Drawing Sheets

U.S. PATENT DOCUMENTS

| | | |
|---|---|---|
| 3,635,149 A | 1/1972 | Smith et al. |
| 3,640,814 A | 2/1972 | Koch II et al. |
| 3,669,870 A | 6/1972 | Boost et al. |
| 3,674,670 A | 7/1972 | Erikson et al. |
| 3,682,136 A | 8/1972 | Haney et al. |
| 3,694,336 A | 9/1972 | Fiala |
| 3,716,468 A | 2/1973 | Chiappe |
| 3,728,247 A | 4/1973 | Haney |
| 3,815,617 A | 6/1974 | Faust |
| 3,830,716 A | 8/1974 | Haney et al. |
| 3,830,902 A | 8/1974 | Barnes |
| 3,843,503 A | 10/1974 | Wagner |
| 3,879,277 A | 4/1975 | Guzzetta et al. |
| 3,898,151 A | 8/1975 | Nessar |
| 3,923,623 A | 12/1975 | Brown et al. |
| 3,945,901 A | 3/1976 | Nessar |
| 3,997,418 A | 12/1976 | Buse et al. |
| 4,005,000 A | 1/1977 | Kraska |
| 4,107,016 A | 8/1978 | Brower, Jr. et al. |
| 4,119,522 A | 10/1978 | Brower, Jr. et al. |
| 4,165,242 A | 8/1979 | Kelly et al. |
| 4,189,845 A | 2/1980 | Candor |
| 4,208,261 A | 6/1980 | Todoroki et al. |
| 4,208,262 A | 6/1980 | Kubo et al. |
| 4,217,918 A | 8/1980 | Faunce et al. |
| 4,422,774 A | 12/1983 | Little |
| 4,463,704 A | 8/1984 | Farnam et al. |
| 4,529,492 A | 7/1985 | Buchholz et al. |
| 4,537,669 A | 8/1985 | McInnes |
| 4,544,475 A | 10/1985 | Heffner et al. |
| 4,693,801 A | 9/1987 | Bolte |
| 4,799,589 A | 1/1989 | Peleckis |
| 4,812,211 A | 3/1989 | Sakai |
| 4,832,183 A | 5/1989 | Lapeyre |
| 4,889,070 A | 12/1989 | Sari et al. |
| 4,889,227 A | 12/1989 | Toncelli |
| 4,942,956 A | 7/1990 | Acker et al. |
| 4,959,137 A | 9/1990 | Matsuoka et al. |
| 5,012,918 A | 5/1991 | Acker et al. |
| 5,025,750 A | 6/1991 | Sessa et al. |
| 5,087,331 A | 2/1992 | Roll et al. |
| 5,096,564 A | 3/1992 | Jowitt et al. |
| 5,104,507 A | 4/1992 | Offenburger |
| 5,114,751 A | 5/1992 | Ahmed et al. |
| 5,120,410 A | 6/1992 | Herdzina, Jr. |
| 5,164,056 A | 11/1992 | Loeck |
| 5,169,621 A | 12/1992 | DiMaio et al. |
| 5,203,975 A | 4/1993 | Richardson |
| 5,223,104 A | 6/1993 | Grassi et al. |
| 5,264,096 A | 11/1993 | Jorgens |
| 5,275,707 A | 1/1994 | Yamada et al. |
| 5,306,346 A | 4/1994 | DiMaio et al. |
| 5,317,272 A | 5/1994 | Jorgens |
| 5,348,634 A | 9/1994 | Matsuo et al. |
| 5,348,637 A | 9/1994 | Kobayashi et al. |
| 5,362,327 A | 11/1994 | Sessa et al. |
| 5,379,880 A | 1/1995 | Stone et al. |
| 5,385,655 A | 1/1995 | Brent et al. |
| 5,391,277 A | 2/1995 | Weng |
| 5,433,834 A | 7/1995 | Belz et al. |
| 5,494,754 A | 2/1996 | Schubert et al. |
| 5,562,810 A | 10/1996 | Urquhart |
| 5,603,818 A | 2/1997 | Brent et al. |
| 5,624,540 A | 4/1997 | Jorgens |
| 5,679,160 A | 10/1997 | Wallace et al. |
| 5,810,987 A | 9/1998 | Opitz |
| 5,817,220 A | 10/1998 | Chen |
| 5,846,395 A | 12/1998 | Sarrine et al. |
| 5,851,368 A | 12/1998 | Rumph |
| 5,951,805 A | 9/1999 | Nonis et al. |
| 6,036,826 A | 3/2000 | Kawachi et al. |
| 6,153,270 A | 11/2000 | Russmann et al. |
| 6,162,339 A | 12/2000 | Salman et al. |
| 6,206,965 B1 | 3/2001 | Rao et al. |
| 6,207,568 B1 | 3/2001 | Wallace et al. |
| 6,235,117 B1 | 5/2001 | McDonald |
| 6,312,576 B1 | 11/2001 | December |
| 6,342,144 B1 | 1/2002 | December |
| 6,350,359 B1 | 2/2002 | Doebler et al. |
| 6,368,719 B1 | 4/2002 | Siever et al. |
| 6,372,107 B1 * | 4/2002 | Besinger et al. ............. 204/479 |
| 6,436,260 B1 | 8/2002 | Lorenz et al. |
| 6,447,931 B1 | 9/2002 | Miyatake et al. |
| 6,554,988 B1 | 4/2003 | Dahms et al. |
| 6,592,668 B2 | 7/2003 | Rao et al. |
| 2002/0092319 A1 | 7/2002 | Jagaeus |
| 2002/0162749 A1 | 11/2002 | Emmonds et al. |
| 2002/0168551 A1 | 11/2002 | Emmonds et al. |
| 2003/0052009 A1 | 3/2003 | Case et al. |
| 2003/0132115 A1 | 7/2003 | Andreae et al. |
| 2003/0213694 A1 | 11/2003 | Emmonds et al. |
| 2004/0016643 A1 | 1/2004 | Emmonds et al. |

FOREIGN PATENT DOCUMENTS

| | | |
|---|---|---|
| EP | 382.283 | 8/1990 |
| EP | 0550000 A1 | 7/1993 |
| EP | 0550000 B1 | 7/1993 |
| JP | 09125289 | 5/1997 |

* cited by examiner

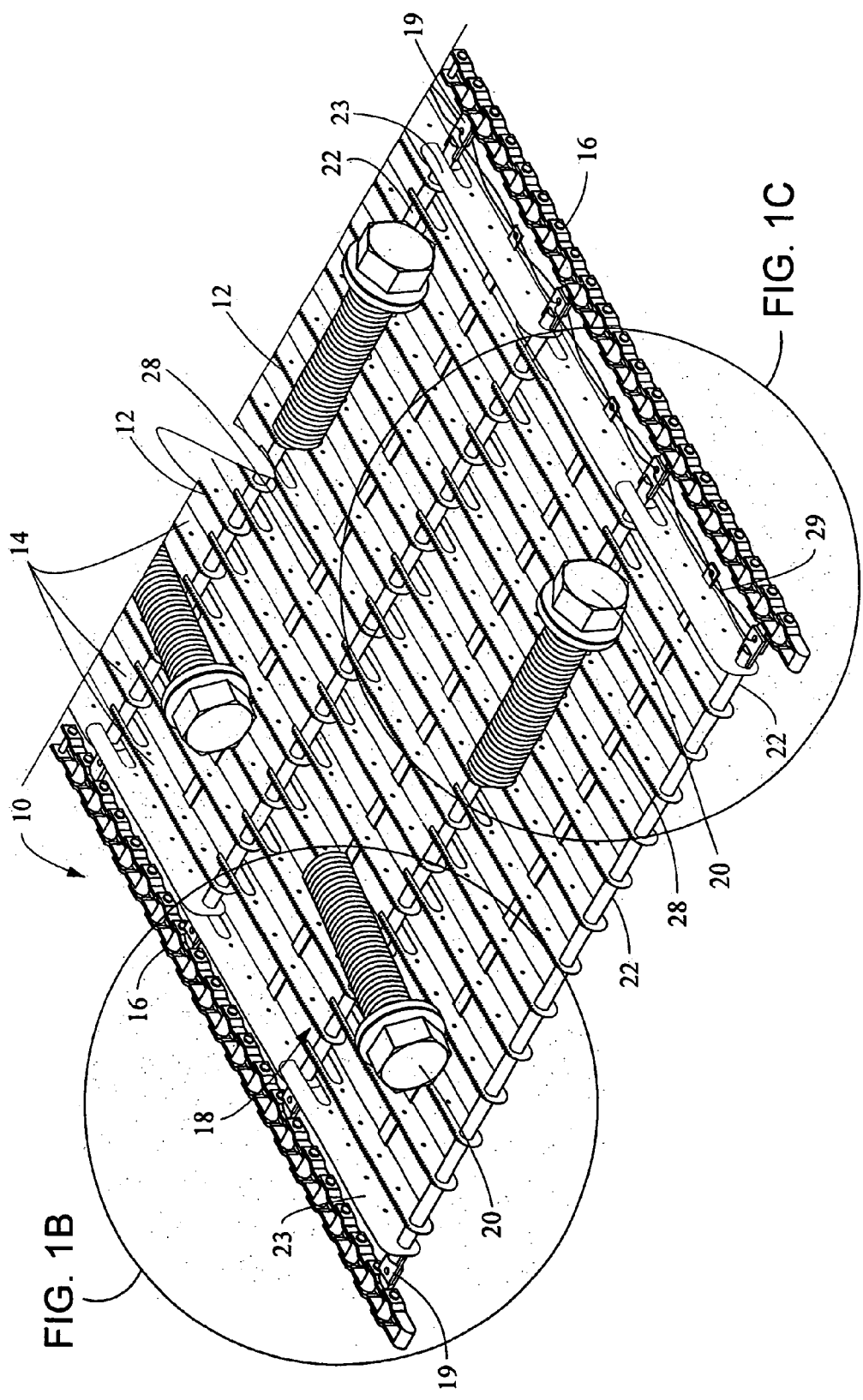

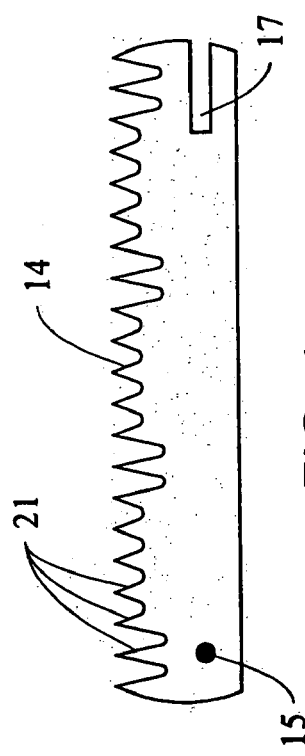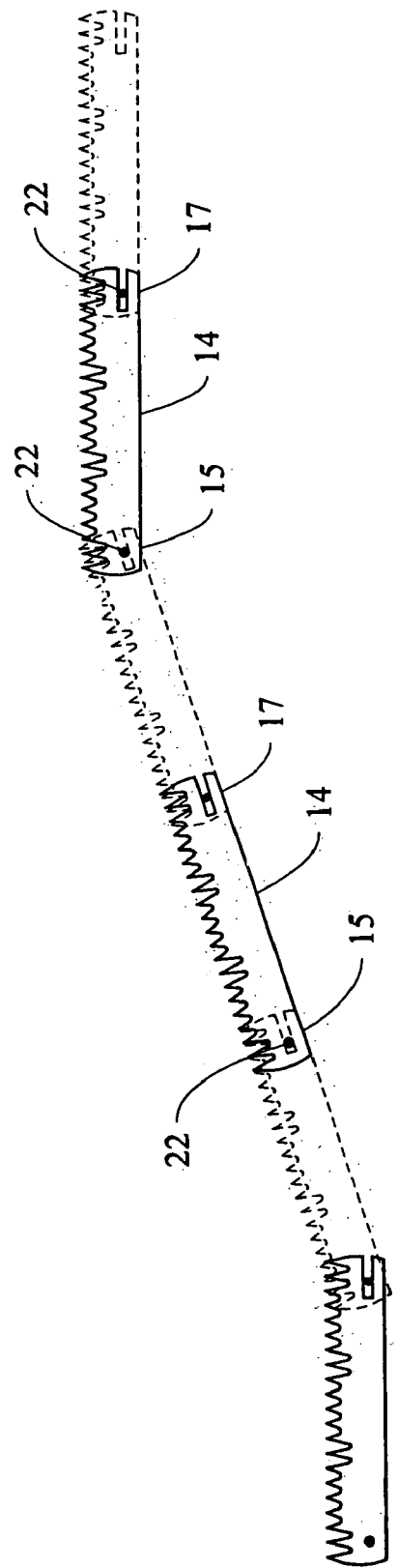

APPARATUS AND SYSTEMS FOR COATING OBJECTS

CROSS-REFERENCE TO RELATED APPLICATIONS

This application claims the benefit of U.S. Provisional Patent Application Ser. No. 60/601,729, filed Aug. 13, 2004, which is incorporated by reference herein in its entirety.

FIELD OF THE INVENTION

The present invention relates to apparatus and systems for coating objects, and, more particularly, relates to continuous belts and systems for coating objects.

BACKGROUND & DISCUSSION

In the manufacture of products, such as industrial and automotive components, various small parts, such as stampings, castings, seat and clamp assemblies, bolts, clamps, conduit, pipes, and the like, are employed that mainly serve a functional role in the final assembly. In order to prepare these parts for final assembly, a coating material is typically deposited on at least portions of the part. In many instances, the entire part is coated to provide a finished appearance to the part and/or provide protection to the underlying substrate from damaging effects as a result of use, wear, and/or environmental conditions.

Because of the substantial number of small parts employed in the manufacturing industry, various coating techniques have been employed for depositing material on these parts at high speeds. For example, small parts can be spread and loosely placed on a flat metal mesh conveyor belt for high-speed coating. The parts are transferred to one or more additional belts prior to the parts being processed through a drying unit. In many instances, the individual parts come in close proximity to or engage each other while passing through the coating and drying systems such that when the coating is applied over the parts and dried or cured, two or more parts may adhere together at the point of engagement (known as a "touch point"). These coated parts must then be separated from each other with some degree of force that, typically, results in the removal of at least some of the coating from each of the parts at or around the touch point. Touch points may also be formed when a part touches the side of the conveyor. Additionally, even if no contact is made between parts or the sides of the conveyor, contact is still present between the part and the conveyor belt that it is resting on, and a touch point is present at each point of contact with the belt. This is particularly the case in electrophoretic coating processes that require the conveyor belt to be in electrical contact with the part to supply the necessary charge prior to or at the time of coating.

At the very least, the touch point provides an unsightly blemish on the finished product. When the part is formed from a corrosive material, the touch point, in addition to its reduced appearance, has a substantially greater chance of developing premature signs of corrosion following assembly. Because the parts are randomly positioned on the belt, it is difficult to predict the location of the touch points prior to coating.

In the coating process described above, because, for example, the small parts are randomly placed on the conveyor belt and the parts are transferred to one or more additional belts prior to the drying unit, it has been difficult to minimize the occurrence of touch points. Accordingly, in order to meet quality standards, the supplier employing this coating technique may find it necessary to incur time and cost consuming efforts to sort and scrap non-conforming parts.

Apparatus and/or systems that can materially reduce or avoid the shortcomings discussed above and/or improve coating and manufacturing efficiency, while providing a coated part that meets or exceeds functional and aesthetic quality requirements, are desired.

SUMMARY OF THE INVENTION

The present invention provides a continuous system for the application of a coating to an object. The system comprises a continuous belt comprising at least one supporting member positioned to retain the object thereon, a drive member in operative engagement with the continuous belt, a coating unit in communication with the continuous belt, and a drying unit in communication with the continuous belt and the coating unit and arranged such that the object is coated and dried on the continuous belt.

The present invention also provides a continuous belt for coating an object through a continuous coating system, comprising at least one supporting member positioned to retain the object thereon, the supporting member comprising at least one blade member comprising a plurality of projections, at least one of which is positioned to contact the object.

It should be understood that this invention is not limited to the embodiments disclosed in this summary, but it is intended to cover modifications that are within the spirit and scope of the invention, as defined by the claims.

BRIEF DESCRIPTION OF THE DRAWINGS

The foregoing summary, as well as the following detailed description of the preferred embodiments, will be better understood when read in conjunction with the appended drawings. In the drawings:

FIG. 1A is a perspective view of one embodiment of the continuous belt of the present invention;

FIG. 4 is a side elevation view of one embodiment of the blade member of the continuous belt, as illustrated in FIG. 1A;

FIG. 5 is a side elevation view illustrating travel of the continuous belt of FIG. 1A absent the side and guide members entering or exiting the coating unit (not shown) of the present invention;

DETAILED DESCRIPTION OF THE INVENTION

Figure 1B:
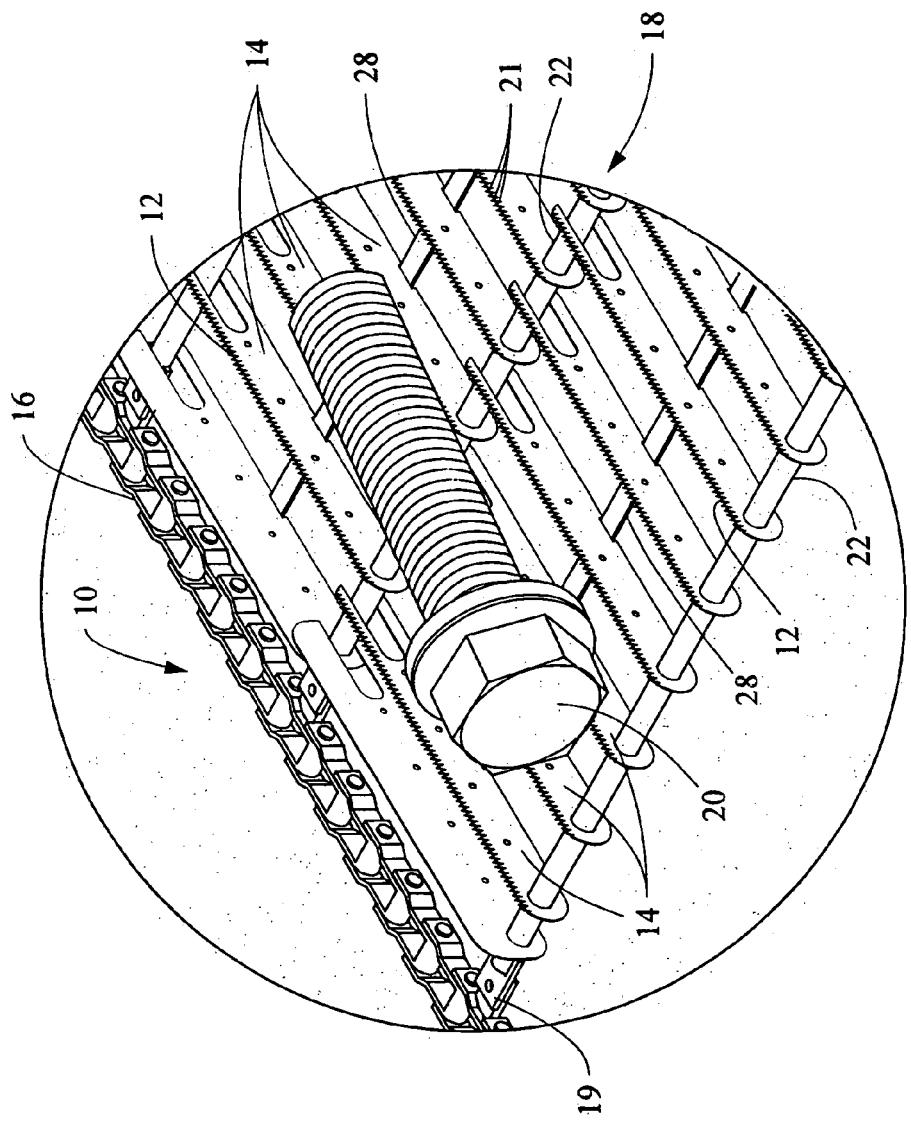
FIG. 1B is a perspective exploded view of one portion of the continuous belt, as illustrated in FIG. 1A.

It is to be understood that the Figures and descriptions of the present invention have been simplified to illustrate elements that are relevant for a clear understanding of the present invention, while eliminating, for purposes of clarity, other elements. Those of ordinary skill in the art will recognize that other elements may be desirable in order to implement the present invention. However, because such elements are well known in the art, and because they do not facilitate a better understanding of the present invention, a discussion of such elements is not provided herein.

In the descriptions of the present invention, the invention will be described and illustrated in the form of an apparatus for depositing a coating on an object having a particular configuration. To the extent that this configuration gives size and structural shape to the object, it should be understood that the invention is not limited to embodiment in such form and may have application in whatever size, shape, and configuration of objects desired to be coated. Thus, while the present invention is capable of embodiment in many different forms, this detailed description and the accompanying drawings disclose only specific forms as examples of the invention. Those having ordinary skill in the relevant art will be able to adapt the invention to application in other forms not specifically presented herein based upon the present description. For example, in the descriptions of the present invention, the invention will be illustrated as a system and/or apparatus for coating an object, such as, for example, a bolt. It should be understood that the detailed description in this form is only illustrative of the present invention, and that the present invention may be employed with objects of other shapes and configurations that are not specifically described herein.

Also, the present invention and devices to which it may be attached may be described and/or illustrated herein in a normal operating position, and terms such as upper, lower, front, back, horizontal, proximal, distal, etc., may be used with reference to the normal operating position of the referenced device or element. It will be understood, however, that the apparatus of the invention may be manufactured, stored, transported, used, and sold in orientations other than those described and/or illustrated herein.

Other than in the operating examples, or where otherwise indicated, all numbers expressing quantities of ingredients, reaction conditions and so forth used in the specification and claims are to be understood as being modified in all instances by the term "about". Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in any specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value of equal to or less than 10.

All patents and publications set forth herein are incorporated herein by reference. Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference.

The present invention is directed to apparatus and systems for depositing at least one coating on an object, such as, for example, via electrophoretic coating techniques. As used herein, the phrase "deposited on" a substrate and like terms means deposited or provided above or over but not necessarily adjacent to the surface of the substrate. For example, a coating can be deposited directly on the substrate or one or more other coatings can be applied therebetween.

As used herein, the term "object" is meant to include all articles that may suitably be placed on the continuous belt as set forth herein, particularly those that may be coated for subsequent use. The term "object" is meant to include, for example, industrial, automotive, and aerospace small parts that may be used in the final assembly of products, such as, for example, stampings, castings, seat and clamp assemblies, bolts, clamps, conduit, pipes, and any other bodies employed in manufacturing. For illustration purposes only, and without intending to limit the scope of the present invention, the object is illustrated as a bolt with integral washer.

As used herein, the term "retain" and like terms means to keep or support.

The present invention provides continuous systems for the application of a coating to an object comprising a continuous belt having in certain nonlimiting embodiments at least one supporting member positioned to retain the object thereon, a drive member in operative engagement with the continuous belt, a coating unit in communication with the continuous belt, a rinse unit in communication with the continuous belt, and a drying unit in communication with the continuous belt and the coating unit and arranged such that the object is coated and dried on the continuous belt. In the discussion below, the coating system may be, for example, an electrophoretic coating system. The continuous systems may include a movable belt to which the objects are situated thereon for movement with the belt. Although the Figures illustrate one embodiment of the continuous belt apparatus that can be used to convey an object, such as a bolt, from a point of origin to a destination point through a coating and/or drying unit of a coating system, it should be understood that the invention is not limited to embodiment in such form and may have application in whatever design, size, shape, and/or configuration of continuous belt desired to be employed. Thus, while the present invention is capable of embodiment in many different forms, this detailed description and the accompanying drawings disclose only specific forms of continuous belts as examples of the invention. Those having ordinary skill in the relevant art will be able to adapt the invention to application in other forms not specifically presented herein based upon the present description. For example, in one belt embodiment discussed in detail below, the belt may be formed from a series of belt segments that are affixed to one another by means of coupling devices to form a continuous belt of a desired length. The belt segments can be of any desired length, and the belt segments that form the belt need not be of a uniform length. At least one supporting member, such as a blade member, and in some embodiments a plurality of blade members, may be affixed to the belt and act to accept, retain, and/or convey, objects. The supporting members may include projections taking the shape of, for example, a saw tooth cross-sectional profile that contact portions of the object. In embodiments where the object is a bolt, for example, surfaces of the bolt, including the bolt shaft, need only be in contact with the belt apparatus at one or more relatively fine projection points along the length of the bolt. Therefore, relatively small and, possibly, substantially invisible or unrecognizable points are created on the surfaces of the object at the points of contact with the belt apparatus. It should be noted, however, that other forms of continuous belts that are not specifically set forth herein may be employed in the systems of the present invention.

Figure 1C:
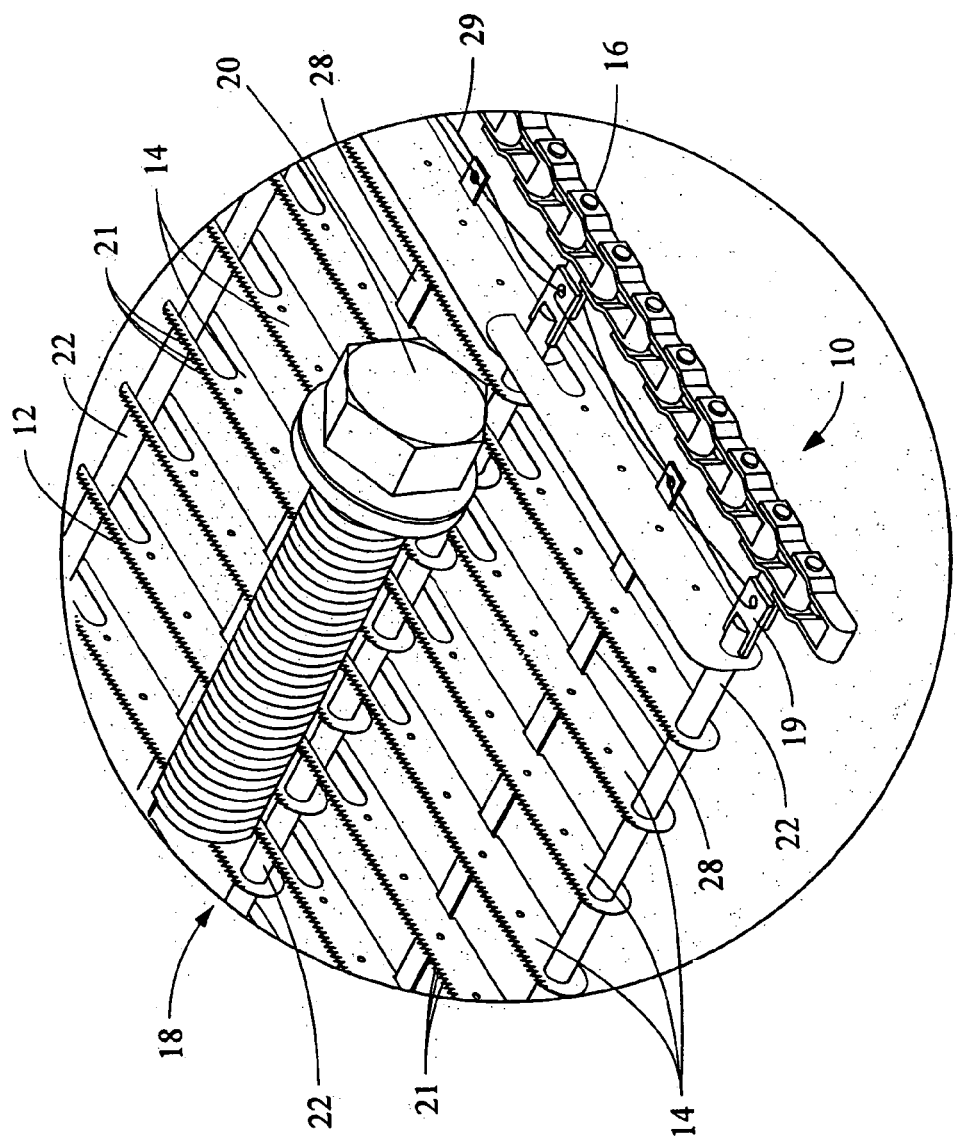
FIG. 1C is a perspective exploded view of one portion of the continuous belt, as illustrated in FIG. 1A.

Turning now to the drawings, FIGS. 1A-1C illustrate embodiments of the continuous belt 10 employed in the systems of the present invention. Belt 10 supports and/or retains one or more objects 20 thereto for subsequent treatment through a coating and/or drying process, described below. Belt 10 may be continuous, i.e., it is, or may be, attached end-to-end to form an endless loop when positioned on a drive mechanism. Belt 10 may be generally formed of any durable material known in the art for withstanding the temperatures and conditions associated with the continuous coating of objects. In embodiments of the present invention, belt 10 may be formed of a resilient, durable, and/or conductive material, such as, for example, aluminum, stainless steel, or mild steel. Although belt 10 is shown in a horizontal configuration, it is understood that other configurations, such as, for example, an angled configuration, may be employed and that such modifications are intended to be included within the scope of the present invention. On belt 10 may be attached at least one supporting member 12. The supporting member 12 may be in the form of various conveying surfaces such as, for example, at least one and, typically, a plurality of, blade members 14 to retain and/or electrically contact objects 20. Supporting members 12 may include projections 21, as outward extensions, from its base. In one embodiment, supporting members 12 have a thickness of about 0.06 inches (about 0.15 cm). Belt 10 may have an open bottom portion, as illustrated, to, for example, provide a greater degree of belt flexibility, to aid in drying and cooling the coated object, and/or to avoid retention of coating material as belt 10 travels through the coating system 50, described below.

Figure 2:
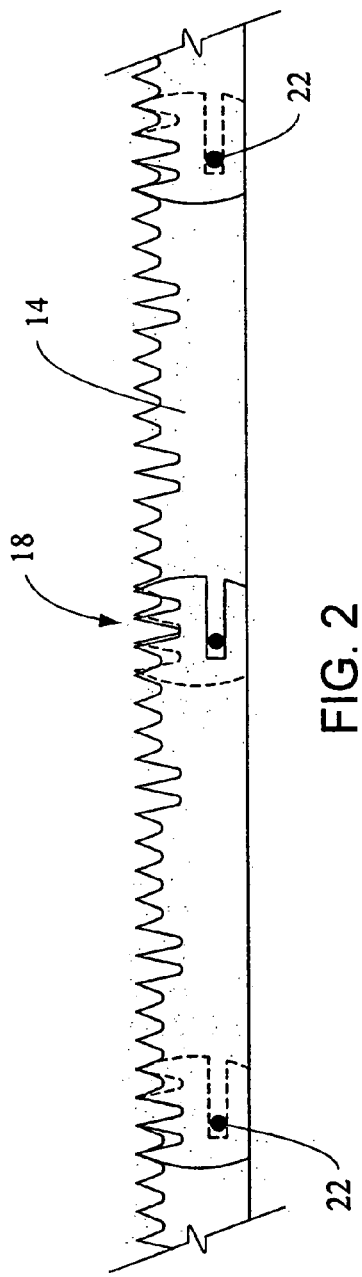
FIG. 2 is a side elevation view of the continuous belt absent the side and guide members, as illustrated in FIG. 1A.
Figure 3:
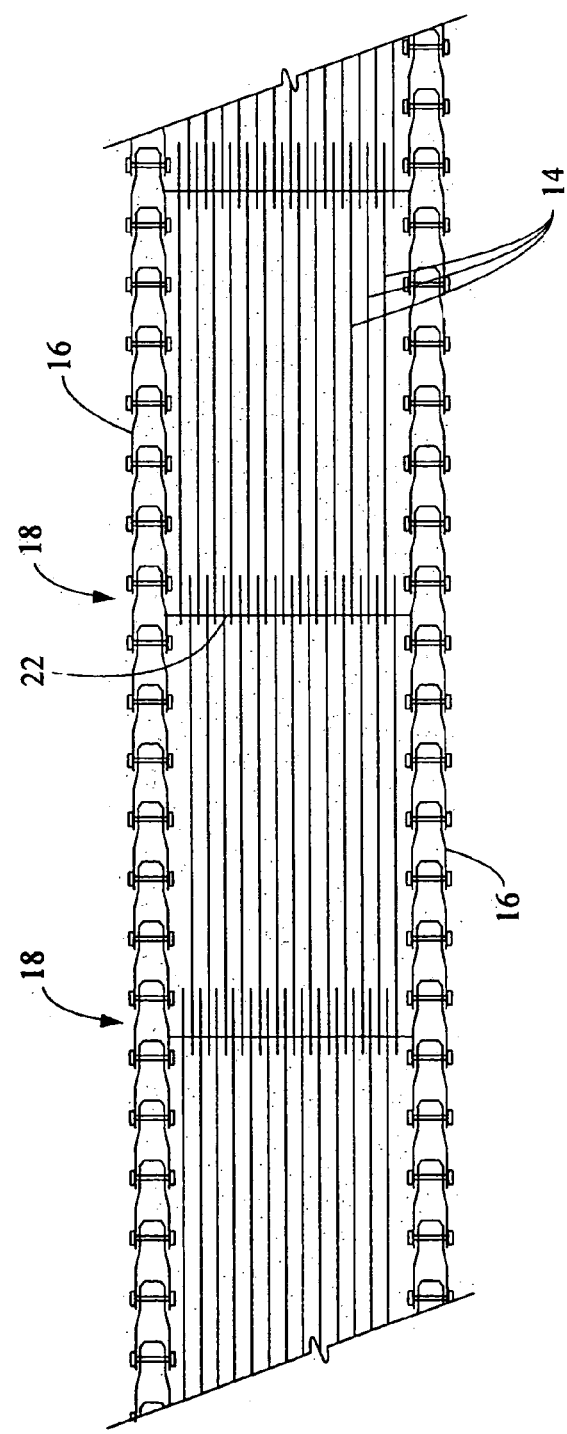
FIG. 3 is a top plan view of the continuous belt, as illustrated in FIG. 1A.

When employed, blade members 14 may be positioned on belt 10 and may include a plurality of projections 21 (FIGS. 1B and 1C), at least one of which acts to at least partially support or contact objects 20 at points of relatively small surface area to minimize touch points. When coating system 50 is an electrophoretic coating system, projections 21 may also act as electrical contact points to pass charge to objects 20. In addition, projections 21 may provide points of added friction in order to more securely retain objects 20 to belt 10 as belt 10 moves through the various sections of coating system 50. Blade members 14 may be any size or shape to contact objects 20 and/or to aid in the retention of objects 20 to belt 10. For example, the contact points of blade members 14 may have a repeating saw tooth cross-sectional profile in the form a plurality of contact points positioned along the blade members 14 to contact objects 20 when objects 20 are properly oriented on belt 10. In one embodiment, best illustrated in FIGS. 2 and 4, the cross-sectional profile of the contact points of blade members 14 may be in the form of a pruning blade. Various commercial blades may be employed, such as those manufactured under the tradename MILWAUKEE SAWZALL pruning blade, Model 48-00-1303, from Milwaukee Electric Tool Corporation, Milwaukee, Wis. Blade members 14 may be formed of any resilient material that supports objects 20 on belt 10, and may be formed of a resilient electrically conductive material. In certain embodiments of the present invention, blade members 14 may be formed of a resilient, durable, and conductive material, such as stainless steel or mild steel, which may, if desired, be further hardened by heat treatment. Blade members 14 may be secured to belt 10 by any manner known in the art. For example, and as illustrated, belt 10 may include one or more coupling devices, such as elongated pins 22 passing through blade members 14, with elongated pins 22 engaging side members 16 by, for example, tabs 19 extending therefrom. Any suitable fasteners may be employed to affix elongated pins 22 to side members 16 such as, for example, rivets, bolts, screws, and the like.

Blade members 14 may be arranged in any orientation suitable for electrically contacting and/or retaining objects 20, such as, for example, in an orientation substantially parallel to each other, as illustrated. The blade members 14 may be spaced apart such that the distance between any two blade members 14 is less than the length, width, or height of objects 20 to be coated, to prevent passage of objects 20 through belt 10. When belt 10 includes side members 16, blade members 14 may be oriented relative to side members 16 in any suitable arrangement thereto such as, for example, diagonal, parallel, perpendicular, or combinations thereof. It is contemplated that various angles or orientations may be employed, based on, for example, the size, shape, and placement of objects 20 to be coated, or the operation of belt 10 through coating system 50. Guide members 23 that are shaped and oriented in a manner similar to blade members 14 may also be employed. When employed, guide members 23 may be slightly larger than blade members 14 so that objects 20 on belt 10 do not slide from belt 10 due to forces on belt 10 as belt 10 travels through coating system 50.

As best illustrated in FIGS. 1A-1C and FIG. 4, each blade member 14 may include a pivotable portion 15 and a slotted portion 17 for operative movement of belt 10 through continuous system 50. The pivotable portion 15 may include an opening passing through the blade member 14 for receipt of coupling device 22, which, as illustrated, is an elongated pin 22. In this embodiment, the cross sectional diameter of elongated pin 22 may be sized slightly smaller than the diameter of the opening to allow blade members 14 to freely rotate around pin 22 at pivotable portion 15 as belt 10 changes its direction of travel from, for example, a generally horizontal to an angled direction of, for example, 15° to 20° from horizontal, such as when belt 10 travels into or out of coating unit 74, described below. In addition, each blade member 14 may include a slotted portion 17 that may be an open or closed notch at an end opposite pivotable portion 15. Slotted portion 17 may have any height suitable for receipt of elongated pin 22. The notch height may be slightly larger than the cross sectional diameter of elongated pin 22, and the notch length may be any length that allows relatively free pivotable and/or lateral movement of blade members 14 of belt 10 at an end opposite pivotable portion 15. For example, elongated pin 22 may allow blade members 14 at slotted portion 17 to freely pivot, expand, or contract as belt 10 changes direction, such as when belt 10 travels around bends through coating system 50.

As illustrated in FIGS. 1A-1C and FIG. 3, belt 10 may have a plurality of blade members 14 in the form of individual belt segments for operative movement through continuous coating system 50. As illustrated, and by way of example, blade members 14 may have at least one overlapping section 18 such that pivotable portion 15 of one segment of blade members 14 engages the same coupling device 22 as the slotted portion 17 of an adjacent segment of blade members 14. This arrangement provides a staggered blade orientation, as illustrated, such that blade members 14 are retained in their orientation by coupling device 22, in the form of, for example, elongated pin 22. If removal of one segment of belt 10 is desired, removal of elongated pin 22 from side members 16 allows the segment of blade members 14 having their pivotable portion 15 engaging the removed elongated pin 22 to be separated from belt 10, by sliding the opposite ends of blade members 14 engaging adjacent elongated pin 22 from the open end of slotted portion 17. In this manner, the staggered, overlapping arrangement of blade members 14 allows relative and, at least, partial independent movement of individual segments of belt 10 through the coating system 50.

It is contemplated that the belt components, such as blade members 14 and elongated pin 22, may be adjustable and positionable to retain objects of varying sizes such that a single belt 10 may be employed on a production line to coat a series of different sized objects having, for example, differing diameters, lengths, and the like. In this form, belt replacement could be reduced or substantially eliminated between runs of various sized objects (e.g. bolts of differing diameters or lengths) or entirely different objects (e.g. a run of bolts immediately followed by a run of clamps).

When the process for coating objects 20 is an electrophoretic coating process, belt 10 of the present invention may include at least one electrical grounding member 28, and typically includes a plurality of grounding members 28 positioned along belt 10 to insure a satisfactory ground for the electrical circuit in the process. When employed, electrical grounding members 28 may be positioned at a bottom portion of belt 10 below blade members 14 and electrically connected thereto through any means known in the art, such as by use of fasteners or by welding. In certain embodiments of the present invention, and as illustrated in the FIGS. 1A-1C, grounding members 28 may each be an electrically conductive plate or bar and positioned in a notch in blade members 14 and secured to an underside thereto. The grounding members 28 may be oriented on belt 10 in any manner that provides suitable electrical contact therewith, such as in a substantially perpendicular orientation to blade members 14, as illustrated. Typically, grounding members 28 may be formed of an electrically conductive material that is compatible with the material that forms blade members 14. In certain embodiments of the present invention, grounding members 28 are formed of a resilient, durable, and/or conductive material, such as aluminum, stainless steel, or mild steel.

Grounding members 28 may provide electrical contact through belt 10 by any means known in the art. For example, grounding members 28 may be electrically connected to elongated pin 22 by grounding connectors 29, such as grounding cables, that provide electrical conductivity through grounding members 28 to elongated pin 22 and through side members 16. Suitable grounding cables may be lug-to-lug flexible braided grounding cables identified as Model 69925K32, commercially available from McMaster-Carr Supply Company, Atlanta, Ga. Grounding connectors 29 may be held in place by, for example, rivets, bolts, screws, and the like to provide electrical contact through belt 10. Grounding connectors 29 may also be formed of an electrically conducting material, such as mild steel, stainless steel or aluminum, so that as belt 10 is conveyed, such as by rotation, by a drive mechanism, grounding members 28 may contact one or more components of coating system 50 to electrically ground belt 10.

It is contemplated that various other support members 12, as conveying surfaces, may be employed in the present invention in place of, or in addition to, blade members 14. Suitable support members 12 may include, for example, grating strips having a plurality of projections, such as those commercially available under the tradename GRIP STRUT, from McNichols Company, Tampa, Fla. which include diamond shaped openings edged with serrated teeth. Support members 12 may also include a series of trays engaging belt 10 with small gaps therebetween. The series of trays may be arranged such that objects 20 are loaded so as not to bridge from one tray to another. In these alternative embodiments, the supporting members 12 may be arranged and configured on belt 10 by various means, such as, for example, in a manner similar to those described herein.

Figure 7:
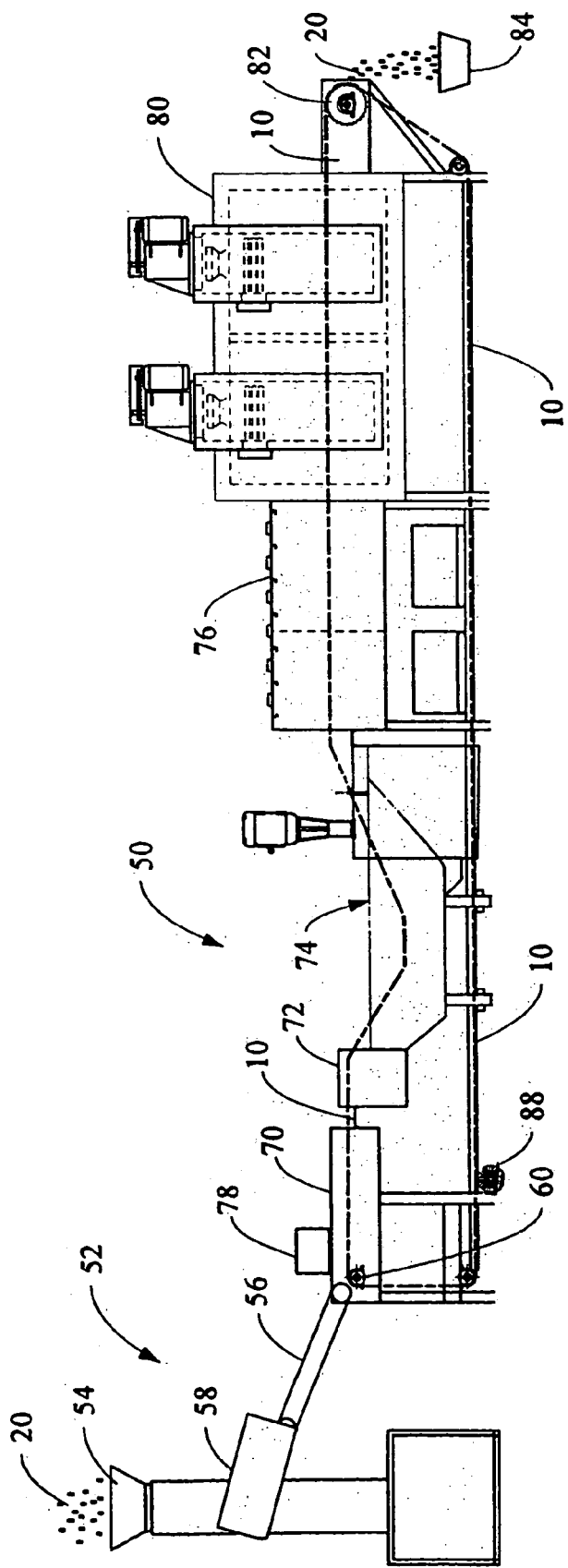
FIG. 7 is a schematic side elevation view of the coating system of the present invention.

Turning now to FIG. 7, the continuous belt 10 of the present invention may be employed in a continuous coating system 50 that may include a drive mechanism or system 60, 82 in operative engagement with belt 10 for rotation as an endless system through an optional pretreatment unit 70, coating unit 74, rinse unit 76, and drying unit 80. Coating system 50 employed in the present invention may be any system for coating objects 20 known to those of ordinary skill in the art and may include, for example, electrophoretic or electrodeposition coating systems or processes. Although any continuous coating system may be employed, for illustrative purposes only, and without intending to be limited to any particular embodiment, the continuous system 50 will be described and illustrated in the form of an electrodeposition coating system for coating metallic objects 20.

Although objects 20 may be manually fed onto belt 10, continuous coating system 50 typically includes an object feeding mechanism 52 for receiving, orienting, and/or feeding objects to be coated. Feeding mechanism 52 typically includes a hopper 54, for receiving a bulk load of objects 20, and one or more conveyors 56 for transporting objects from hopper 54 in a streaming queue to a pick-up point at belt 10. Conveyor 56 may be of any conventional type, such as, but not limited to, a belt conveyor, a chain conveyor a platform conveyor, a gravity conveyor and the like. Feeding mechanism 52 may also include a conventional sorting device 58 for orienting or distributing objects 20 from conveyor 56 onto belt 10. Feeding mechanism 52, and, more specifically, conveyor 56 may feed a plurality of objects 20 onto belt 10 by methods well known to those of ordinary skill in the art, such as, for example, in a streaming, random manner that may avoid piling of objects 20 on belt 10. Feeding mechanism 52 employed in the present invention may be one that is well known in the art, or may be assembled from various conventional hopper, sorting, and conveying components. For example, if objects 20 to be coated are threaded bolts, suitable bolt hopper, bolt sorter and bolt conveyor mechanisms are commercially available from Spectrum Automation Company, Livonia, Mich. It is contemplated that various object feeding mechanisms 52 may be employed in the present invention.

In particular, the path of each object 20 on conveyor 56 is along a path that is in general alignment and engagement with belt 10, such that objects 20 may be placed and retained on one or more projections 21 of blade members 14. The projections 21, such as in the form of saw teeth, act to support and/or retain objects 20 on belt 10 and provide contact therewith at one or more fine points along their length. As objects 20 are fed from feeding mechanism 52 onto belt 10, objects 20 travel along a path of the belt 10 as it is conveyed, such as by rotation, by drive mechanism 60 and/or 82. The drive mechanism employed in the present invention may be any known mechanism for driving known continuous belt conveyor systems, or it can be of the type that is shown in the Figures. The drive mechanism 60, 82 may be in operative rotational engagement with belt 10 by any means known to those of ordinary skill in the art, such as, for example, by a conventional sprocket arrangement wherein one or more toothed drive wheels 82 engage links in side members 16 that are in the form of chain members extending substantially the length of belt 10 to provide movement to belt 10 and, consequently, to objects 20. The speed of belt 10, as conveyed by drive mechanism 60, 82, may be at any speed that is in operative association with the speed at which objects 20 are being fed from conveyor 56. Although the rate of travel of belt 10 through coating system 50 may be at any rate, in certain non-limiting embodiments, continuous line production may be performed at 5.0 feet per minute (1.5 meters per minute).

As discussed above, when the process for coating objects 20 is an electrophoretic coating process, such as an electrodeposition coating process, belt 10 of the present invention may include at least one electrical grounding member 28, and typically a plurality of grounding members 28, positioned on belt 10 to ensure a satisfactory ground for the electrical circuit in the process.

Before depositing coatings on the surface of the object 20, it may be necessary to remove foreign matter from the metal surface by thoroughly cleaning and/or degreasing the object surface. In this regard, optional pretreatment unit 70 may include a cleaning system that prepares the surface of objects 20 for coating. The surface of the object 20 can be cleaned by any physical or chemical means known in the art, such as mechanically abrading the surface or, as is typical, cleaning/degreasing with commercially available alkaline or acidic cleaning agents that are well known to those skilled in the art, such as sodium metasilicate and sodium hydroxide. Non-limiting examples of suitable cleaning agents include CHEMKLEEN 163 and CHEMKLEEN 177 phosphate cleaners, both of which are commercially available from PPG Industries, Inc. of Pittsburgh, Pa.

Following, or in lieu of, the cleaning step, the surface of the object 20 may be rinsed with water, typically deionized water, in order to remove any residue. Optionally, the metal surface can be rinsed with an aqueous acidic solution after cleaning with the alkaline cleaners. Examples of rinse solutions include mild or strong acidic cleaners such as the dilute nitric acid solutions commercially available and conventionally used in, for example, metal pretreatment processes. The object 20 may be air-dried using an air knife, by flashing off the water by brief exposure of the object 20 to a high temperature.

Optionally, a phosphate-based pretreatment or conversion coating can be applied to the object 20 when object 20 includes a metallic substrate. Suitable phosphate conversion coating compositions include those known in the art, such as zinc phosphate, optionally modified with nickel, iron, manganese, calcium, magnesium or cobalt. Useful phosphating compositions are described in U.S. Pat. Nos. 4,793,867 and 5,588,989; 4,941,930; 5,238,506 and 5,653,790.

A drying/preheating mechanism may be employed to dry and/or preheat objects 20 as they pass through pretreatment unit 70 prior to being charged for coating in coating unit 74. Any drying and/or preheating method known to those skilled in the art may be employed in pretreatment unit 70, such as for example, infrared, electron beam, actinic radiation, convection, induction, and combinations thereof. Pretreatment unit 70 may also be hooded, as illustrated, depending on the cleaning solution employed.

Objects 20 to be pretreated with a cleaner and/or a conversion coating can be conveyed through pretreatment unit 70 by any of the mechanisms known to those skilled in the art, such as any chain driven conventional flat-wire or chain linked continuous belt, a barrel, and/or a basket, among other means. In certain embodiments, objects 20 are conveyed through pretreatment unit 70 by a chain driven balanced weave belt (which comprises alternating left and right hand spirals joined with crimped connectors), such as is supplied by Cambridge International, Inc., and Ashworth Brothers, Inc. In certain embodiments, the balance weave belt has elongated loops which allow a supporting member to pass through the balanced weave.

Following the optional pretreatment stage, and prior to or upon entering coating unit 74, objects 20 may be charged by a conductor 72. Electrical current is applied on one polarity from conductor 72 to the electrodeposition bath and in the opposite polarity to the conductive belt 10, and thereby to objects 20. In the process of the present invention, object 20 serves as an electrode, typically the cathode, in an electrical circuit comprising the electrode and a counter-electrode that are immersed in an aqueous electrodepositable coating composition.

Generally, in the process of applying the electrodepositable coating, the aqueous dispersion of the electrodepositable composition is placed in contact with an electrically conductive anode and cathode. Upon passage of an electric current between the anode and cathode, an adherent film of the electrodepositable composition will deposit in a substantially continuous manner on the object 20 serving as either the anode or the cathode depending on whether the composition is anionically or cationically electrodepositable. Although any suitable voltage may be employed to charge conductive belt 10, the voltage employed may be dependent on the size and shape of object 20 to be coated, and the applied coating material. Electrodeposition is usually carried out at a constant voltage ranging from 1 volt to 7,000 volts, and typically between 50 and 500 volts. Current density is usually between about 1.0 ampere and 15 amperes per square foot (10.8 to 161.5 amperes per square meter). If the coating material used is anionic, belt 10 is supplied with an anionic charge, whereas if the coating material used is cationic, belt 10 is supplied with a cationic charge.

Coating unit 74 may contain an electrodepositable coating material, drawing such material from, for example, a pump well, a storage unit, such as a feed tank, and may be positioned to coat all or a portion of objects 20 on belt 10. Coating system 50 may also employ a recirculation system that allows coating unit 74 and the storage unit to be in fluid communication. Any electrophoretic coating unit may be employed in continuous coating system 50 of the present invention, such as, for example, an electrodeposition tank, and the like. As illustrated, coating unit 74 includes an electrodeposition tank. In addition, in certain embodiments, coating unit 74 may comprise an electrodeposition tank that includes means for agitation of the electrodepositable coating material stored therein. For example, agitation may be provided at or near the bottom of the electrodeposition tank by feeding the electrodepositable coating material into eductors positioned along the bottom portion of the coating unit 74. In addition, agitation may be directed near coating belt 10, at or near the top of the electrodeposition tank, by including risers arranged to discharge the electrodepositable coating material towards the top and bottom of coating belt 10.

The electrodeposition bath composition may be employed in a tank as one embodiment in the systems of the present invention, may be polymeric, and may comprise a resinous phase dispersed in an aqueous medium. The resinous phase includes a film-forming organic component which can comprise an anionic electrodepositable coating composition, or, as is typical, a cationic electrodepositable coating composition. The electrodepositable coating composition typically comprises an active hydrogen group-containing ionic resin and a curing agent having functional groups reactive with the active hydrogens of the ionic resin.

As used herein, the term "reactive" refers to a functional group that forms a covalent bond with another functional group under suitable reaction conditions.

Non-limiting examples of anionic electrodepositable coating compositions include those comprising an ungelled, water-dispersible electrodepositable anionic film-forming resin. Examples of film-forming resins suitable for use in anionic electrodeposition coating compositions are base-solubilized, carboxylic acid containing polymers, such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the at least partially neutralized interpolymers of hydroxy-alkyl esters of unsaturated carboxylic acids, unsaturated carboxylic acid and at least one other ethylenically unsaturated monomer. Yet another suitable electrodepositable anionic resin comprises an alkyd-aminoplast vehicle, i.e., a vehicle containing an alkyd resin and an amine-aldehyde resin. Yet another anionic electrodeppsitable resin composition comprises mixed esters of a resinous polyol. These compositions are described in detail in U.S. Pat. No. 3,749,657 at col. 9, lines 1 to 75 and col. 10, lines 1 to 13. Other acid functional polymers can also be used such as phosphatized polyepoxide or phosphatized acrylic polymers as are well known to those skilled in the art.

By "ungelled" is meant that the polymer is substantially free of crosslinking and has an intrinsic viscosity that can be measured when dissolved in a suitable solvent. The intrinsic viscosity of a polymer is an indication of its molecular weight. A gelled polymer, on the other hand, since it is of essentially infinitely high molecular weight, will have an intrinsic viscosity too high to measure.

With reference to the cationic resin, a wide variety of cationic polymers are known and can be used in the compositions of the invention so long as the polymers are "water dispersible," i.e., adapted to be solubilized, dispersed, or emulsified in water. The water dispersible resin is cationic in nature, that is, the polymer contains cationic functional groups to impart a positive charge. Typically, the cationic resin also contains active hydrogen groups.

Examples of cationic resins suitable include onium salt group-containing resins such as ternary sulfonium salt group-containing resins and quaternary phosphonium salt-group containing resins, for example, those described in U.S. Pat. Nos. 3,793,278 and 3,984,922, respectively. Other suitable onium salt group-containing resins include quaternary ammonium salt group-containing resins, for example, those that are formed from reacting an organic polyepoxide with a tertiary amine salt. Such resins are described in U.S. Pat. Nos. 3,962,165; 3,975,346; and 4,001,101. Also suitable are the amine salt group-containing resins such as the acid-solubilized reaction products of polyepoxides and primary or secondary amines such as those described in U.S. Pat. Nos. 3,663,389; 3,984,299; 3,947,338 and 3,947,339.

Usually, the salt group-containing resins described above are used in combination with a blocked isocyanate curing agent. The isocyanate can be fully blocked as described in U.S. Pat. No. 3,984,299 or the isocyanate can be partially blocked and reacted with the resin backbone such as is described in U.S. Pat. No. 3,947,338.

Also, one-component compositions as described in U.S. Pat. No. 4,134,866 and DE-OS No. 2,707,405 can be used as the cationic resin. Besides the epoxy-amine reaction products, resins can also be selected from cationic acrylic resins such as those described in U.S. Pat. Nos. 3,455,806 and 3,928,157. Also, cationic resins which cure via transesterification such as described in European Application No. 12463 can be used. Further, cationic compositions prepared from Mannich bases such as described in U.S. Pat. No. 4,134,932 can be used. Also useful in the electrodepositable coating compositions of the present invention are those positively charged resins that contain primary and/or secondary amine groups. Such resins are described in U.S. Pat. Nos. 3,663,389; 3,947,339; and 4,115,900. U.S. Pat. No. 3,947,339 describes a polyketimine derivative of a polyamine such as diethylenetriamine or triethylenetetraamine with the excess polyamine vacuum stripped from the reaction mixture. Such products are described in U.S. Pat. Nos. 3,663,389 and 4,116,900.

In one embodiment of the present invention, the cationic resins suitable for inclusion in the electrodepositable coating compositions useful in the present invention are onium salt group-containing acrylic resins.

The cationic resin described above is typically present in the electrodepositable coating compositions in amounts of 1 to 60 weight percent, preferably 5 to 25 weight percent based on total weight of the composition.

As previously discussed, the electrodepositable coating compositions which are useful in the present invention typically further comprise a curing agent which contains functional groups which are reactive with the active hydrogen groups of the ionic resin.

Aminoplast resins, which are typically used as curing agents for anionic electrodeposition, are the condensation products of amines or amides with aldehydes. Examples of suitable amine or amides are melamine, benzoguanamine, urea and similar compounds. Generally, the aldehyde employed is formaldehyde, although products can be made from other aldehydes such as acetaldehyde and furfural. The condensation products contain methylol groups or similar alkylol groups depending on the particular aldehyde employed. Preferably, these methylol groups are etherified by reaction with an alcohol. Various alcohols employed include monohydric alcohols containing from 1 to 4 carbon atoms such as methanol, ethanol, isopropanol, and n-butanol, with methanol being preferred. Aminoplast resins are commercially available from American Cyanamid Co. under the trademark CYMEL and from Monsanto Chemical Co. under the trademark RESIMENE.

The aminoplast curing agents are typically utilized in conjunction with an active hydrogen-containing anionic electrodepositable resin in amounts ranging from about 5 percent to about 60 percent by weight, preferably from about 20 percent to about 40 percent by weight, the percentages based on the total weight of the resin solids in the electrodeposition bath.

Curing agents that can be employed for cationic electrodepositable coating compositions include blocked organic polyisocyanates. The polyisocyanates can be fully blocked as described in U.S. Pat. No. 3,984,299 column 1 lines 1 to 68, column 2 and column 3 lines 1 to 15, or partially blocked and reacted with the polymer backbone as described in U.S. Pat. No. 3,947,338 column 2 lines 65 to 68, column 3 and column 4 lines 1 to 30. By "blocked" is meant that the isocyanate groups have been reacted with a compound so that the resultant blocked isocyanate group is stable to active hydrogens at ambient temperature but reactive with active hydrogens in the film forming polymer at elevated temperatures, usually between 90° C. and 200° C.

Suitable polyisocyanates include aromatic and aliphatic polyisocyanates, including cycloaliphatic polyisocyanates; representative examples include diphenylmethane-4,4'-diisocyanate (MDI), 2,4- or 2,6-toluene diisocyanate (TDI), including mixtures thereof, p-phenylene diisocyanate, tetramethylene and hexamethylene diisocyanates, dicyclohexylmethane-4,4'-diisocyanate, isophorone diisocyanate, mixtures of phenylmethane-4,4'-diisocyanate and polymethylene polyphenylisocyanate. Higher polyisocyanates such as triisocyanates can be used. An example would include triphenylmethane-4,4',4''-triisocyanate. Isocyanate prepolymers with polyols such as neopentyl glycol and trimethylolpropane and with polymeric polyols such as polycaprolactone diols and triols (NCO/OH equivalent ratio greater than 1) can also be used.

The polyisocyanate curing agents are typically utilized in conjunction with the cationic resin in amounts ranging from 1 weight percent to 65 weight percent, such as from 5 weight percent to 45 weight percent, based on the weight of the total resin solids present composition.

The aqueous compositions of the present invention are in the form of an aqueous dispersion. The term "dispersion" is believed to be a two-phase transcoating, translucent or opaque resinous system in which the resin is in the dispersed phase and the water is in the continuous phase. The average particle size of the resinous phase is generally less than 1.0 and usually less than 0.5 microns, and may be less than 0.15 micron.

The concentration of the resinous phase in the aqueous medium is at least 1 and usually from about 2 to about 60 percent by weight based on total weight of the aqueous dispersion. When the compositions of the present invention are in the form of resin concentrates, they generally have a resin solids content of about 20 to about 60 percent by weight based on weight of the aqueous dispersion.

Electrodeposition baths useful in the present invention are typically supplied as two components: (1) a clear resin feed, which includes generally the active hydrogen-containing ionic electrodepositable resin, i.e., the main film-forming polymer, the curing agent, and any additional water-dispersible, non-pigmented components; and (2) a pigment paste, which generally includes one or more pigments, a water-dispersible grind resin which can be the same or different from the main-film forming polymer, and, optionally, additives such as wetting or dispersing aids. Electrodeposition bath components (1) and (2) are dispersed in an aqueous medium which comprises water and, usually, coalescing solvents.

The electrodeposition bath of the present invention has a resin and pigment solids content usually within the range of about 5 to 25 percent by weight based on total weight of the electrodeposition bath.

Besides water, the aqueous medium may also contain a coalescing solvent. Useful coalescing solvents include hydrocarbons, alcohols, esters, ethers and ketones. The preferred coalescing solvents include alcohols, polyols and ketones. Specific coalescing solvents include isopropanol, butanol, 2-ethylhexanol, isophorone, 2-methoxypentanone, ethylene and propylene glycol and the monoethyl, monobutyl and monohexyl ethers of ethylene glycol. The amount of coalescing solvent can be between about 0.01 and 25 percent such as from about 0.05 to about 5 percent by weight based on total weight of the aqueous medium.

As discussed above, a pigment composition and, if desired, various additives such as surfactants, wetting agents or catalyst can be included in the dispersion. The pigment composition may be of the conventional type comprising pigments, for example, iron oxides, lead oxides, strontium chromate, carbon black, coal dust, titanium dioxide, talc, barium sulfate, as well as color pigments such as cadmium yellow, cadmium red, chromium yellow and the like.

The pigment content of the dispersion is usually expressed as a pigment-to-resin ratio. In the practice of the invention, when pigment is employed, the pigment-to-resin ratio is usually within the range of about 0.02 to 1:1. The other additives mentioned above are usually in the dispersion in amounts of about 0.01 to 3 percent by weight based on weight of resin solids.

The present invention may also employ non-electrophoretic coating compositions. Suitable non-electrophoretic coating compositions can be any of a variety of coating compositions well known in the art and the specific composition utilized is generally based upon the final appearance and performance properties desired by the user. For example, the non-electrophoretic coating composition can be a liquid coating composition or in solid particulate form, e.g., a powder coating composition. Suitable non-electrophoretic coating compositions are those set forth in U.S. Pat. No. 6,676,820, which is incorporated herein by reference in its entirety.

Referring again to FIG. 7, as belt 10 carries objects 20 from optional pretreatment unit 70 into coating unit 74, belt 10, and particularly blade members 14, may be pivotably rotated, for example, from a horizontal position to a slightly angled position, such as at a 15-20 degree angle from horizontal, to enter coating unit 74. As best illustrated in FIG. 5, pivotable portion 15 and slotted portion 17 of blade members 14 allow blade members 14 to pivot around elongated pins 22 to provide relatively free angular movement thereto such that belt 10 freely enters and exits coating unit 74 when the coating unit 74 employs a coating tank, as illustrated. As a result, coating materials in coating unit 74 may be readily applied to each object 20 positioned on belt 10.

Coating unit 74 may also serve as a reservoir to collect excess coating material from the exterior surface of objects 20 as the coated objects 20 are carried away by belt 10 after coating, to prevent waste thereof. In this manner, the electrophoretic coating may be deposited upon objects 20 to a desired thickness based on various factors, such as the speed of belt 10, the composition of the coating material, the temperature of coating unit 74, and the like. Typically, the temperature of coating unit 74 and coating material is maintained in the range of 21 to 38° C. Coating times through coating unit 74 may vary considerably and depend on voltage, temperature and composition of the coating material, desired film thickness, and the like. Typical coating time is 2 minutes, and may range from 30 seconds to 5 minutes.

The excess coating material may be rinsed from coated object by one or more rinsing units 76 positioned downstream from coating unit 74. Air knives (not shown) may be employed to remove excess rinse water from objects 20. Rinsing unit 76 may include a recycle system for returning excess material to the mother tank for reuse. Deionized water, municipal water, and/or permeate from an ultrafiltration system 78 may be used for rinsing the excess material from objects 20. The rinse water may be filtered and expelled from coating system 50, or may be recycled back through the system for reuse in order to provide a closed, non-polluting system.

Belt 10 may carry the coated and, optionally, rinsed objects 20 through drying unit 80 to dry the coating deposited on objects 20. As used herein the terms "dry", "dried", or "drying" are intended to include both drying and curing. In one embodiment, the electrodeposited coating is dried by driving substantially all the solvent and/or water from the coating either by evaporation at ambient temperature or by forced drying at elevated temperatures (for example 150° F. to 600° F. (82° C. to 316° C.)). The term "dried" is also intended to include exposing the electrocoated object 20 to thermal conditions sufficient to crosslink the co-reactive film components.

Also, as used herein, the term "cure" as used in connection with a composition, e.g., "a cured composition," shall mean that any crosslinkable or co-reactive components of the composition are at least partially crosslinked or co-reacted. In certain embodiments of the present invention, the crosslink density of the crosslinkable components, i.e., the degree of crosslinking, ranges from 5% to 100% of complete crosslinking. In other embodiments, the crosslink density ranges from 35% to 85% of full crosslinking. In other embodiments, the crosslink density ranges from 50% to 85% of full crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen. This method determines the glass transition temperature and crosslink density of free films of coatings or polymers. These physical properties of a cured material are related to the structure of the crosslinked network.

Generally, the electrodepositable coating compositions which are useful in the present invention are applied under conditions such that a substantially continuous coating having a dried film-thickness ranging from 0.3 to 2.0 mils (7.6 to 50.8 micrometers), usually from 0.6 to 1.0 mils (15.2 to 25.4 micrometers) is formed upon the surfaces of objects 20.

Any method known to those skilled in the art of drying the applied coating may be employed, such as, for example, infrared, electron beam, actinic radiation, convection, induction, and combinations thereof. For example, drying unit 80 of continuous system 50 may employ heat treatment to the coating by the combination of infrared radiation and convection. In one embodiment of the present invention, after the coating has been applied by electrodeposition, it is cured, usually by heating, at elevated temperatures ranging from 82° C. to 316° C. for a period ranging from 60 to 2400 seconds. Alternatively, the coating can be cured using infrared curing techniques as are well known in the art, typically for a period ranging from 5 to 300 seconds or a time sufficient to obtain a peak metal temperature ranging from 300° F. to 550° F. (149° C. to 288° C.). For non-metallic substrates, the times and temperatures may be adjusted and depend, at least in part, on the particular substrate employed.

In one embodiment of the present invention, a cooling unit, such as a refrigeration unit, a series of blowers (not shown), water misting nozzles, and/or a water bath, may be positioned after drying unit 80 to lower the temperature of objects 20 for handling and transport. Air may be blown over objects 20 at any suitable velocity and temperature, and may range from, for example, 150 to 10,000 ft/min (0.8 to 51 m/s) at ambient. Typically, the cooling unit reduces the surface temperature of objects 20 to below 120° F. (49° C.).

Figure 6:
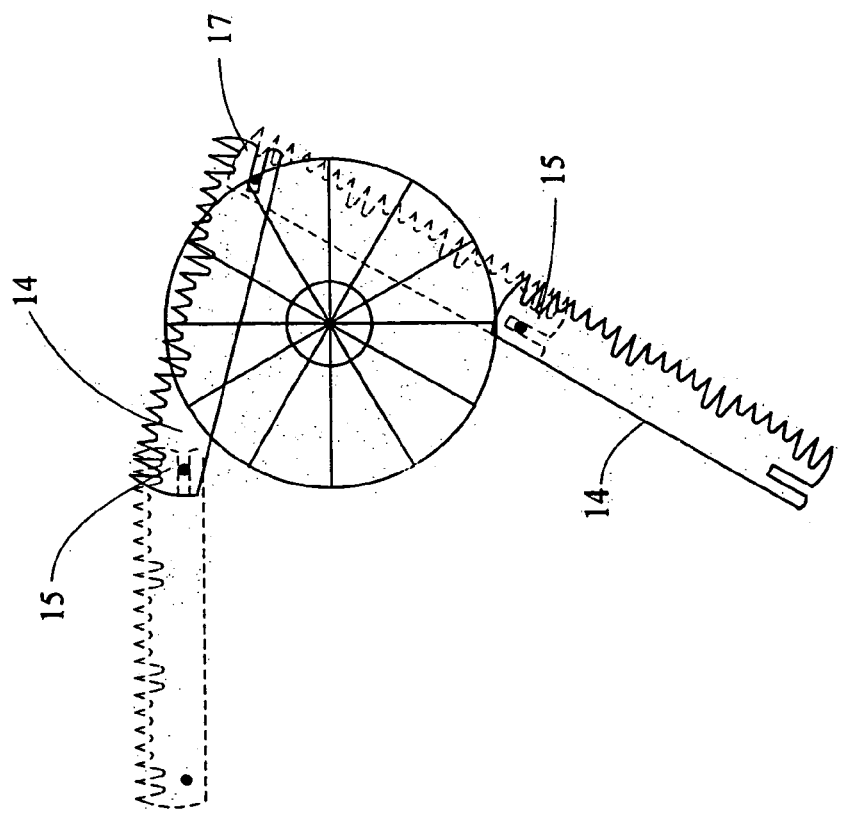
FIG. 6 is a side elevation view illustrating travel of the continuous belt of FIG. 1A absent the side and guide members around a drive wheel.

After exiting drying unit 80 and passing through the optional cooling unit, objects 20 may be released from belt 10 by manual or automated means. Suitable releasing means include mechanical assistance and/or gravity assisted means wherein as belt 10 is conveyed over drive wheel 82, the movement of belt 10 around drive wheel 82, with the aid of gravity, acts to release each object 20 from belt 10. As belt 10 is conveyed around drive wheel 82, belt 10 may be rotated, for example, from a horizontal position to an angled position, such as, for example, at a 90 to 180 degree angle, as belt 10 make its return to the feeding mechanism 52. Although belt 10 may be conveyed around drive wheel 82 at any angle, in one embodiment of the present invention, the angle of rotation may be 135 degrees, so that objects 20 may fall clear of belt 10 as belt 10 conveyed around drive wheel 82. As illustrated in FIG. 6, pivotable portion 15 and slotted portion 17 of blade members 14 allow blade members 14 to substantially freely rotate around elongated pin 22 via relative movement thereto provide a means for belt 10 to expand and contract as belt 10 freely rotates around drive wheel 82 and other return wheels, as illustrated. The released and coated objects 20 may then be deposited in receptacle 84 for packing or for further processing. Continuous rotation of belt 10 returns belt 10 back to the feeding mechanism 52 for receipt of additional objects 20 for support and retention therewith for coating and drying.

Coating system 52 may include a cleaning unit 88, such as a rotatable brush, as illustrated, that cleans the surface of belt 10 to reduce buildup of coating on the belt surface and/or to promote electrical contact between blade members 14 and objects 20 prior to receiving additional objects 20 for coating. In embodiments of the present invention that employ a rotatable brush, as illustrated, the rotatable brush may be formed of any suitable material that effectively cleans the surface of the belt 10, and may include individual resilient bristles, such as carbon steel wire bristles, that provide effective cleaning of, for example, the tips of the saw teeth and therebetween. One or more additional cleaning units, such as a rotatable brush, may be employed after the release of objects 20 to reduce coating buildup on, for example, side chains 16, to enhance belt 10 to conductor 72 contact.

Although the coating system 50 set forth above has been described as applying a single coating over objects 20, it is contemplated that more that one coating may be deposited on objects 20. For example, two or more layers of coating may be deposited on objects 20 by adding additional coating and drying units to the coating system 50 described above, or by running coated objects 20 through the coating system 50 one or more additional times, or by running objects. 20 through a combination of coating system 50 (when electrophoretic) in conjunction with one or more non-electrophoretic coating systems either prior or subsequent to coating system 50. Accordingly, the description of the coating system 50 set forth above is merely illustrative of one method of employing the coating system 50, and is not intended to limit the scope of the present invention.

The present invention allows objects to be coated at high speeds through various coating processes, while reducing the risk that those coated surfaces will be marred or, otherwise damaged, by providing a supporting member having one or more, and in some embodiments a plurality of, small contact points along the length of the object. The relatively small contact points may minimize the touch points on the object, promote electrical ground after repeated coating cycles, and/or promote the application of a smoother coating on the surface of the object. In addition, the present invention provides a system for coating objects on a single continuous belt through the coating and drying units without the need for belt transfer. As a result, the deposited coating on the surfaces of the object may be more uniform and include fewer defects than previous prior art coating techniques.

Whereas particular embodiments of this invention have been described above for purposes of illustration, it will be evident to those skilled in the art the numerous variations of the details of the present invention may be made without departing from the invention as defined in the appended claims.

What is claimed is:

1. A continuous system for the application of a coating to an object, comprising:

a continuous belt comprising at least one supporting member positioned to retain the object thereon, the supporting member comprising at least one blade member comprising a plurality of projections in the form of a plurality of saw teeth for supporting the object thereon;

a drive member in operative engagement with the continuous belt;

a coating unit in communication with the continuous belt, the continuous belt configured to change direction of travel through the coating unit; and a drying unit, in communication with the continuous belt and the coating unit and arranged such that the object is coated and dried on the continuous belt.

2. The system of claim 1, wherein the continuous belt includes a plurality of blade members arranged to retain the object thereon.

3. The system of claim 2, wherein the plurality of blade members are arranged in a substantially parallel orientation.

4. The system of claim 3, wherein the continuous belt includes side members extending substantially the length of the belt, each blade member being positioned substantially parallel to the side members.

5. The continuous belt of claim 4, wherein the side members are chain members that operatively engage the drive member.

6. The system of claim 1, wherein the supporting member comprises a plurality of blade members comprising at least one overlapping section and connected by an elongated pin extending therethrough.

7. The system of claim 1, wherein the supporting member comprises a plurality of blade members, each blade member comprising a pivotable portion and slotted portion, each portion configured to receive an elongated pin for operative movement of the continuous belt through the continuous system.

8. The system of claim 1, wherein the supporting member comprises a plurality of saw tooth blade members having a repeating cross sectional profile.

9. The system of claim 8, wherein the repeating cross-sectional profile is in the shape of a pruning blade.

10. The system of claim 1, wherein the continuous belt further comprises at least one electrical grounding member positioned to be in electrical contact with at least one component of the system.

11. The system of claim 10, wherein the at least one component is positioned to be in electrical contact with a plurality of grounding members spaced on the belt.

12. The system of claim 1, wherein the coating unit comprises an electrodeposition tank comprising means for agitation of an electrodepositable coating material stored therein.

13. The system of claim 1, further comprising a cleaning unit comprising a rotatable brush.

14. A continuous system for the application of an electrophoretic coating to an object, comprising:

a continuous belt comprising at least one supporting member positioned to retain the object thereon and configured to pass electrical charge to the object, the supporting member comprising a plurality of blade members, at least one blade member comprising a plurality of projections for supporting the object thereon, each blade member comprising a pivotable portion and slotted portion, each portion configured to receive an elongated pin for operative movement of the continuous belt through the continuous system;

a drive member in operative engagement with the continuous belt;

an electrophoretic coating unit in communication with the continuous belt; and a drying unit, in communication with the continuous belt and the electrophoretic coating unit and arranged such that the object is coated and dried on the continuous belt.

15. The system of claim 14, wherein the coating unit comprises a coating tank.

16. The system of claim 14, wherein the at least one supporting member comprises a plurality of projections that are configured as electrical contact points to pass charge to the object.

17. The system of claim 14, wherein the continuous belt further comprises at least one electrical grounding member positioned to be in electrical contact with at least one component of the system.

18. The system of claim 14, wherein the coating unit comprises an electrophoretic tank comprising agitation of the electrophoretic coating material stored therein.

19. A continuous system for the application of a coating to an object, comprising:

a continuous belt comprising at least one supporting member positioned to retain the object thereon, wherein the supporting member comprises a plurality of blade members, each blade member comprising a pivotable portion and slotted portion, each portion configured to receive an elongated pin for operative movement of the continuous belt through the continuous system;

a drive member in operative engagement with the continuous belt; a coating unit in communication with the continuous belt; and a drying unit, in communication with the continuous belt and the coating unit and arranged such that the object is coated and dried on the continuous belt.

20. The system of claim 19, wherein the supporting member comprises a plurality of saw tooth blade members having a repeating cross sectional profile.

21. The system of claim 20, wherein the repeating cross-sectional profile is in the shape of a pruning blade.

* * * * *